US005162452A

United States Patent [19]

Herzig et al.

[11] Patent Number: 5,162,452

[45] Date of Patent: Nov. 10, 1992

[54] THERMOCURABLE COMPOSITIONS

[75] Inventors: Christian Herzig; Bernward Deubzer; Josef Esterbauer, all of Burghausen, Fed. Rep. of Germany

[73] Assignee: Wacker-Chemie GmbH, Munich, Fed. Rep. of Germany

[21] Appl. No.: 530,388

[22] Filed: May 30, 1990

[30] Foreign Application Priority Data

Jun. 5, 1989 [DE] Fed. Rep. of Germany ....... 3918328

[51] Int. Cl.[5] ............................................ C08G 8/28

[52] U.S. Cl. ................................... 525/403; 525/409; 525/440; 525/446; 525/452; 525/453; 528/21; 528/23; 528/26; 528/29; 528/30; 427/387

[58] Field of Search ............... 525/446, 403, 409, 440, 525/452, 453; 528/29, 30, 23, 21, 26; 427/387

[56] References Cited

U.S. PATENT DOCUMENTS 4,070,526 1/1978 Colquhoun et al. ................ 430/281
4,725,630 2/1988 Magee et al. ......................... 528/30

FOREIGN PATENT DOCUMENTS 0293852 6/1988 European Pat. Off. .

OTHER PUBLICATIONS

Patent Abstracts of Japan, vol. 13, No. 339, Jul. 31, 1989.

*Primary Examiner*—Melvyn I. Marquis

[57] ABSTRACT

The Thermocurable compositions which contain (A) at least one mercaptoalkyl-containing compound which contains at least two SiC-bonded radicals per molecule of the general formula $$HS{-}R^2{-} \quad (I)$$

where $R^2$ represents a divalent hydrocarbon radical having from 1 to 8 carbon atom(s) per radical, selected from the group consisting mercaptoalkyl-containing organopolysiloxanes and cocondensates of mercaptoalkyl-containing organosilicon compounds containing groups capable of condensation, and hydroxyl-containing organic compounds, (B) at least one vinyl-containing compound which is compatible with constituent (A) and contains at least two groups per molecule of the general formula $$R^4CH{=}CR^3C(O)O{-} \quad (II)$$

where $R^3$ represents a hydrogen atom or a methyl radical, and $R^4$ represents a hydrogen atom or an alkyl radical having from 1 to 3 carbon atom(s) per radical, and (C) a mixture of a strong organic base selected from the group consisting of quaternary ammonium hydroxides, quaternary ammonium alkoxides, tertiary, secondary and primary amines, and a weak protonic acid.

15 Claims, No Drawings

THERMOCURABLE COMPOSITIONS

The present invention relates to thermocurable compositions and more particularly to thermocurable compositions comprising a vinyl-containing compound and a mercaptoalkyl-containing compound selected from the group consisting of mercaptoalkyl-containing organopolysiloxanes and cocondensates of mercaptoalkyl-containing organosilicon compounds having groups which are capable of condensation, and a hydroxyl-containing organic compound, and the use of these compositions in the preparation of coatings.

BACKGROUND OF THE INVENTION

U.S. Pat. No. 4,070,526 to J. Pfenning et al., discloses radiation-curable diorganopolysiloxane molding compositions which contain (A) a mercaptoalkyl-containing diorganopolysiloxane (B) a vinyl-containing organopolysiloxane (C) a vinyl monomer and (D) a photosensitizer.

These compositions are preferably crosslinked by irradiation with ultra-violet light. The compositions are used in the production of adhesive-repellent coatings.

It is an object of the present invention to provide compositions which contain a mercaptoalkyl-containing compound selected from the group consisting of mercaptoalkyl-containing organopolysiloxanes and cocondensates of mercaptoalkyl-containing organosilicon compounds having groups capable of condensation, and hydroxyl-containing organic compounds as crosslinking agents for vinyl-containing compounds. Another object of the present invention is to provide compositions containing mercaptoalkyl-containing organopolysiloxanes as crosslinking agents for vinyl-containing compounds which can be cured at elevated temperatures. Still another object of the present invention is to provide compositions containing mercaptoalkyl-containing organopolysiloxanes as crosslinking agents for vinyl-containing compounds which contain a catalyst system having a long shelf life and are suitable for the production of coatings. A further object of the present invention is to provide compositions containing mercaptoalkyl-containing organopolysiloxanes as crosslinking agents for vinyl containing compounds which give paints that are hard, have strong adhesion to the substrate on which they are applied, have good gasoline resistance and cure well in deep section layers.

SUMMARY OF THE INVENTION

The foregoing objects and others which will become accordance with this invention, general speaking, by providing thermocurable compositions containing, (A) at least one mercaptoalkyl-containing compound which contains at least two SiC-bonded radicals per molecule of the general formula $$HS—R^2— \qquad (I)$$

where $R^2$ represents a divalent hydrocarbon radical having from 1 to 8 carbon atom(s) per radical, selected from the group consisting of mercaptoalkyl-containing organopolysiloxanes and cocondensates of mercaptoalkyl-containing organosilicon compounds containing groups capable of condensation, and hydroxyl-containing organic compounds, (B) at least one vinyl-containing compound which is compatible with constituent (A) and contains at least two groups per molecule of the general formula $$R^4CH{=}CR^3C(O)O— \qquad (II)$$

where $R^3$ represents a hydrogen atom or a methyl radical, and $R^4$ represents a hydrogen atom or an alkyl radical having from 1 to 3 carbon atom(s) per radical, and (C) a mixture of a strong organic base selected from the group consisting of quaternary ammonium hydroxides, quaternary ammonium alkoxides, and tertiary, secondary and primary amines, and a weak protonic acid.

DESCRIPTION OF THE INVENTION

According to the invention, constituent (A) is preferably an organopolysiloxane having average units of the general formula $$R_a(R^1O)_b(HSR^2)_cSiO_{\frac{4-(a+b+c)}{2}} \qquad (III)$$

where R is the same or different and represents a monovalent hydrocarbon radical having from 1 to 8 carbon atom(s) per radical, and a monovalent halogenated hydrocarbon radical having from 1 to 8 carbon atom(s) per radical, $R^1$ is the same or different and represents a hydrogen atom or an alkyl radical having from 1 to 6 carbon atom(s) per radical, $R^2$ represents a divalent hydrocarbon radical having from 1 to 8 carbon atom(s) per radical, a is 0, 1, 2 or 3, with an average of from 0.0 to 2.0, b is 0, 1 or 2, with an average of from 0.0 to 2.0, c is 0, 1 or 2, with an average of from 0.05 to 1.0, and the sum a+b+c is less than 4, and the average sum of a+b is a maximum of 2.0, with the proviso that at least two radicals of the formula $HS—R^2—$ are present per molecule.

The molecular weight of constituent (A) is preferably from 170 to 20,000 g/mol, and more preferably from 400 to 4,000 g/mol, and the viscosity of constituent (A) is preferably from 1 to 10,000 mPa·s at 25° C., and more preferably from 40 to 1,000 mPa·s at 25° C.

Examples of hydrocarbon radicals, represented by R are alkyl radicals, such as the methyl, ethyl, n-propyl, isopropyl, 1-n-butyl, 2-n-butyl, iso-butyl, tert-butyl, n-pentyl, iso-pentyl, neopentyl and tert-pentyl radicals, hexyl radicals, such as the n-hexyl radical, heptyl radicals, such as the n-heptyl radical, octyl radicals, such as the n-octyl radical and iso-octyl radicals, such as the 2,2,4-trimethylpentyl radical; alkenyl radicals, such as the vinyl and allyl radicals; cycloalkyl radicals, such as cyclopentyl, cyclohexyl and cycloheptyl radicals, and methylcyclohexyl radicals; aryl radicals, such as the phenyl radical; alkaryl radicals, such as o-, m-, and p-tolyl radicals, xylyl radicals and ethylphenyl radicals; aralkyl radicals, such as the benzyl radical and α- and β-phenylethyl radicals. The preferred radical is the methyl or phenyl radical.

Examples of halogenated hydrocarbon radicals represented by R are haloalkyl radicals, such as 3,3,3-trifluoro-n-propyl radical, the 2,2,2,2',2',2'-hexafluoroisopropyl radical and the heptafluoroisopropyl radical, and haloaryl radicals, such as the o-, m- and p-chlorophenyl radicals.

Examples of alkyl radicals represented by $R^1$ are the methyl, ethyl, n-propyl, iso-propyl, n-butyl, iso-butyl and tert-butyl radicals and pentyl and hexyl radicals.

Examples of radicals represented by $R^2$ are alkylene radicals, such as $-CH_2-$, $-CH_2CH_2-$, $-(CH_2)_3-$, $-(CH_2)_4-$, $-(CH_2)_6-$ and $-CH_2CH(CH_3)CH_2-$; cycloalkylene radicals, such as the cyclohexylene radical; and arylene radicals, such as the phenylene radical.

A preferred example of the group of formula (I) is that of the formula $$HS(CH_2)_3-.$$

The mercaptoalkyl-containing organopolysiloxanes can be prepared by hydrolysis and cocondensation of mercaptoalkyl-containing silanes of the formula $$R_d(HSR^2)Si(OR^1)_{3-d} \quad (IV)$$

where R, $R^1$ and $R^2$ are the same as above, and d is 0, 1 or 2, and if appropriate with mercaptoalkyl-free silanes of the formula $$R_eSi(OR^1)_{4-e} \quad (V)$$

where R and $R^1$ are the same as above and e is 0, 1, 2 or 3, or by cocondensation and/or equilibration of mercaptoalkyl-containing silanes of formula (IV) with mercaptoalkyl-free organopolysiloxanes containing groups capable of condensation.

However, constituent (A) of this invention may alternatively be a cocondensate prepared from a mercaptoalkyl-containing alkoxysilane of formula (IV) and an organic compound which can be homogeneously condensed with this silane and contains hydroxyl groups, or may be a cocondensate prepared from a mercaptoalkyl-containing, alkoxy-containing organopolysiloxane of formula (III) and an organic compound which can be homogeneously condensed with this organopolysiloxane and contains hydroxyl groups.

Examples of organic compounds which contain hydroxyl groups and with which mercaptoalkyl-containing alkoxysilanes of formula (IV) or mercaptoalkyl-containing, alkoxy-containing organopolysiloxanes of formula (III) can be homogeneously condensed are polyhydric alcohols, such as ethylene glycol, propylene glycol, neopentyl glycol, butylene glycol, trimethylolpropane, trimethylolethane, pentaerythritol and products from the reaction of these polyhydric alcohols with carboxylic acids, such as isophthalic acid, terephthalic acid, trimellitic acid and adipic acid, the hydroxyl groups of the polyhydric alcohols being employed in stoichiometric excess and the reaction products consequently being polyester polyols.

Constituent (B) of this invention is preferably a vinyl-containing compound selected from the group consisting of (1) esters of polyhydric alcohols and $\alpha,\beta$-unsaturated carboxylic acids of the general formula $$R^4CH{=}CR^3C(O)OH \quad (II')$$

where $R^3$ represents a hydrogen atom or a methyl radical, and $R^4$ represents a hydrogen atom or an alkyl radical having from 1 to 3 carbon atom(s) per radical, (2) products from the reaction of $\alpha,\beta$-unsaturated carboxylic acids of the general formula $$R^4CH{=}CR^3C(O)OH \quad (II')$$

where $R^3$ and $R^4$ are the same as above, and OH-containing organic polymers selected from the group consisting of (a) OH-containing polyethers or polyesters and (b) OH-containing copolymers of hydroxyalkyl esters of acrylic acid or methacrylic acid, styrene and, if appropriate, alkyl esters of $\alpha,\beta$-unsaturated mono- or dicarboxylic acids, (3) products from the reaction of $\alpha,\beta$-unsaturated carboxylic acids of the general formula $$R^4CH{=}CR^3C(O)OH \quad (II')$$

where $R^3$ and $R^4$ are the same as above, and epoxide-containing copolymers of epoxyalkyl esters of acrylic acid or methacrylic acid, styrene and, if appropriate, alkyl esters of $\alpha,\beta$-unsaturated mono- or dicarboxylic acids, (4) products from the reaction of hydroxyalkyl esters of $\alpha,\beta$-unsaturated carboxylic acids of the general formula $$R^4CH{=}CR^3C(O)OH \quad (II')$$

where $R^3$ and $R^4$ are the same as above, and isocyanate-containing organic polymers or polyurethanes, (5) products from the reaction of isocyanatoalkyl esters of $\alpha,\beta$-unsaturated carboxylic acids of the general formula $$R^4CH{=}CR^3C(O)OH \quad (II')$$

where $R^3$ and $R^4$ are the same as above, and OH-containing organic polymers, and (6) mixtures of (1) and one of the reaction products (2) to (5).

Preferred examples of the vinyl group of formula (II) and of the corresponding $\alpha,\beta$-unsaturated carboxylic acid of the formula (II') are respectively the acrylate and methacrylate group, and acrylic acid and methacrylic acid.

The vinyl-containing compound (B) is preferably a di-, tri- or tetra(meth)acrylate of polyhydric alcohols. Examples of polyhydric alcohols are alkanediols, such as ethanediol, the various propanediols, butanediols, pentanediols, hexanediols and octanediols, and the corresponding ethers; alkanetriols, such as glycerol, trimethylolpropane and hexanetriol; and pentaerythritol, dipentaerythritol, sorbitol and polyvinyl alcohol. Examples of di-, tri- and tetra(meth)acrylates of this type are 1,4-butanediol diacrylate, neopentyl glycol diacrylate, 1,6-hexanediol diacrylate, trimethylolpropane triacrylate, pentaerythritol triacrylate and pentaerythritol tetraacrylate. Preferably the neopentyl glycol diacrylate and trimethylolpropane triacrylate are used. The preparation of acrylates and methacrylates of this type is described in Houben-Weyl, Methoden der organischen Chemie (Methods of Organic Chemistry), volume E 20, page 1142 (1987); the preparation of trimethylolpropane triacrylate, for example, is described in Chemical Abstracts, Vol. 91, 192843 a (1979).

Examples of the above mentioned reaction products (2) to (5) as constituent (B) are described in U.S. Pat. No. 3,066,112, U.S. Pat. No. 3,539,526, U.S. Pat. No. 3,774,305, U.S. Pat. No. 4,102,856, DE-A 3,541,140, U.S. Pat. No. 4,110,184 and in the Journal of Coating Technology, page 24 (April 1985). A preferred example of reaction products (2) to (5) is a product from the reaction of acrylic acid or methacrylic acid and an epoxide-containing copolymer prepared by copolymerization of glycidyl methacrylate with styrene and dimethyl maleate. Processes for its preparation are described in DE-A 3,541,140.

The viscosity of constituent (B) is preferably from 3 to 300,000 mPa·s at 25° C. and more preferably from 100 to 100,000 mPa·s at 25° C. In order to achieve the low viscosity desired when using vinyl-containing reaction products (2) to (5) as constituent (B), vinyl-containing esters (1) in amounts of from 0 to 100% by weight, based on the total weight of vinyl-containing reaction products (2) to (5), and non-reactive solvents can be added.

Constituent (B) is employed in amounts such that preferably about 0.5 to 2.0 vinyl groups of formula (II), and more preferably from 0.8 to 1.2 vinyl groups of formula (II), are present per mercaptoalkyl group of formula (I) in the composition of this invention.

Constituent (C) in the composition of this invention is a basic catalyst system which contains a strong organic base selected from the group consisting of quaternary ammonium hydroxides, quaternary ammonium alkoxides, and tertiary, secondary and primary amines, which is buffered with a weak protonic acid having a $pK_s$ value of, preferably, greater than 2.

Preferred examples of quaternary ammonium hydroxides are trimethylbenzylammonium hydroxide, trimethylcetylammonium hydroxide, tetraethylammonium hydroxide and tetrabutylammonium hydroxide. The quaternary ammonium bases may also be employed in the form of their alkoxides, if appropriate as a solution in the corresponding alcohol, such as, for example, trimethylbenzylammonium methoxide in methanol.

Examples of tertiary, secondary and primary amines are butylamine, cyclohexylamine, 1,3-diaminopropane, 1,10-diaminodecane, dibutylamine, triethylamine, piperidine, 2-aminopyridine, N,N-dimethylaniline, 1,4-diazabicyclooctane (DABCO), 1,5-diazabicyclo[4,3,0]-non-5-ene (DBN) and 1,8-diazabicyclo[5,4,0]undec-7-ene (DBU).

Examples of protonic acids having a $pK_s$ value greater than 2 are aliphatic carboxylic acids, such as formic acid, acetic acid, propionic acid, adipic acid and ascorbic acid, carbonic acid and sulfurous acid. Volatile organic acids, such as formic acid, acetic acid or propionic acid, are particularly preferred since they can easily be removed during curing.

Constituent (C) is preferably employed dissolved in a polar solvent, such as, for example, an alkanol of short to moderate chain length, in which ethanol or isopropanol is preferably used.

The amount of weak organic acid and strong organic base in constituent (C) affects the pot life of the thermocurable composition without significantly affecting the properties of the cured film.

A strong organic base, for example quaternary ammonium hydroxide, and a weak protonic acid, for example aliphatic carboxylic acid, are preferably employed in stoichiometric amounts. In order to extend the pot life of the thermocurable composition, the weak protonic acid is also preferably employed in stoichiometric excess, up to a 10-equivalent excess of acid. Although an excess of base is possible, it is not preferred since the thermocurable composition then reacts extremely quickly and the pot-life is then extremely short.

Constituent (C) is preferably employed in amounts of from about 0.01 to 10% by weight, preferably from 0.05 to 1% by weight, based on the respective total weight of constituents (A) and (B).

In addition to constituents (A), (B) and (C), the compositions of this invention may contain additional constituents. Examples of such additional constituents are solvents, for example methyl ethyl ketone, methyl isobutyl ketone, ethylene glycol, xylene isomer mixtures, toluene, aromatic-containing technical-grade crude oil distillates, such as Kristallöl 30, (a commercially available mixture of 83% of alkanes and 17% of aromatics, which has a boiling range of from 145° to 190° C. at 1020 hPa (abs.), or mixtures of at least two solvents of this type, pigments, such as titanium dioxide, barium sulfate, inorganic and organic dyes, leveling agents and thinners.

The curing of the composition of this invention can be carried out under mild conditions. The curing of the composition according to this invention is preferably carried out by warming for 15 to 60 minutes at 60° to 80° C. However, the curing can also be carried out at lower temperatures of up to 20° C., in which case the curing time is extended accordingly. The curing can also be accelerated by using elevated temperatures of up to 200° C.

The composition is preferably used to produce hard, gasoline-resistant coatings. For example, it can be used as a two-component system, with constituents (A) and (C) being the first component and constituent (B) being the second component. The constituents or components of the composition of this invention are mixed before use, applied to the surface to be coated, and cured by the action of heat.

Examples of surfaces onto which the coatings of this invention can be applied are those of metals, where the metals may be coated with a primer, a basecoat or a colored paint, plastics, wood products and ceramic materials.

The application of the composition of this invention to the surfaces to be coated may be carried out in any manner, which are suitable for the production of coatings from liquid substances, for example by dipping, brushing, pouring, spraying, rolling, printing, for example using an offset engraved coating device, or by knife or doctor-blade coating.

EXAMPLE 1

(a) About 90 g of 3-mercaptopropylmethyldimethoxysilane are diluted with 200 g of toluene, 7.20 g of water and 0.50 g of sodium carbonate are added, and the mixture is heated to reflux. As soon as the gas-space temperature has reached the boiling point of methanol, the methanol is distilled off via a column. The residue solution is filtered, the toluene is removed by distillation at 5 hPa (abs.), and a 60% solution is prepared from the residue using xylene. A solution having a viscosity of 3.6 $mm^2 \cdot s^{-1}$ at 25° C. of an organopolysiloxane comprising 3-mercaptopropylmethylsiloxane units and having an HS equivalent weight of 238 is obtained.

(b) About 1.15 g (0.019 mol) of glacial acetic acid in 78.85 g of isopropanol are stirred with 20 g of a 25% solution of tetrabutylammonium hydroxide (0.019 mol)

in methanol. After a slight evolution of heat has subsided, the catalyst solution is ready to use. A 6% solution of tetrabutylammonium acetate in isopropanol is obtained.

(c) About 2.34 g of the 3-mercaptopropylmethylpolysiloxane solution described in (a) above, are mixed with 1.10 g of trimethylolpropane trimethacrylate and 10 drops of the catalyst solution prepared in (b) above. The varnish solution is applied to Erichsen steel using a doctor blade and, after evaporation, baked at 80° C. for 30 minutes. The cured film has the properties shown in Table 1.

TABLE 1

| | |
|---|---|
| Pencil hardness(1) | 4H |
| MEK double wipe(4) | 70 |
| Gasoline test (30 min/25° C.)(5) | no traces of dissolution |

(1)by the method of Wolff-Wilborn
(4)resistance to methyl ethyl ketone at a dry film thickness of 30 micrometers
(5)resistance to premium gasoline: a cotton wool swab soaked in premium gasoline is laid on the cured film for 30 minutes at 25° C.

EXAMPLE 2

(a) The procedure described in Example 1 (a) is repeated, except that 196 g (1 mol) of 3-mercaptopropyltrimethoxysilane are substituted for 90 g of 3-mercaptopropylmethyldimethoxysilane, 18 g (1 mol) of water are substituted for 7.20 g of water, and 1.0 g of sodium carbonate are substituted for 0.50 g of sodium carbonate. A highly viscous resin containing 3-mercaptopropylsiloxane units and having an HS equivalent weight of 235 is obtained, from which a 60% solution prepared using a xylene mixture, has a viscosity of 4.2 $mm^2 \cdot s^{-1}$ at 25° C.

(b) About 3.30 g of the solution of 3-mercaptopropylpolysiloxane prepared in accordance with Example 1 (a) are mixed with 1.70 g of neopentyl glycol dimethacrylate and 10 drops of the catalyst solution prepared in accordance with Example 1 (b). The varnish solution is applied to Erichsen steel using a doctor blade and cured under the conditions described in Table 2. The properties of the cured film are summarized in Table 2.

TABLE 2

| Curing | | | |
|---|---|---|---|
| Time (min) | Temperature (°C.) | MEK double wipe(4) | Gasoline test(5) (30 min/25° C.) |
| 30 | 60 | 18 | no traces of dissolution |
| 30 | 80 | 80 | no traces of dissolution |
| 20 | 140 | >100 | no traces of dissolution |

(4)resistance to methyl ethyl ketone at a dry film thickness of 30 micrometers
(5)resistance to premium gasoline: a cotton wool swab soaked in premium gasoline is laid on the cured file for 30 minutes at 25° C.

EXAMPLE 3

(a) A product from the reaction of acrylic acid and an epoxide-containing copolymer of styrene, glycidyl methacrylate and dimethyl maleate is prepared in accordance with the procedure of Example I of DE-A 3,541,140 under A (1). A solution having a solids content of 30% and an acrylic equivalent weight of 2,000 is obtained.

(b) About 4.0 g of the 30% solution, described in (a) above, of an acrylic-containing organic resin and 0.48 g of the solution of a 3-mercaptopropylpolysiloxane prepared in accordance with Example 2 (a) are mixed together with 10 drops of the catalyst solution described in Example 1 (b). The paint solution is applied to Erichsen steel using a doctor blade and baked at 80° C. for 30 minutes. A clear film is obtained which has the properties summarized in Table 3.

TABLE 3

| | |
|---|---|
| Pencil hardness(1) | H |
| Gasoline test (30 min/25° C.)(5) | no traces of dissolution |

(1)by the method of Wolff-Wilborn
(5)resistance to premium gasoline: a cotton wool swab soaked in premium gasoline is laid on the cured film for 30 minutes at 25° C.

EXAMPLE 4

(a) A mixture containing 19.6 g of 3-mercaptopropyltrimethoxysilane, 72.1 g of 3-mercaptopropylmethyldimethoxysilane and 49.6 g of phenyltrimethoxysilane is diluted with 200 g of toluene, then 14.9 g of water and 0.5 g of sodium carbonate are added, and the mixture is heated to reflux. As soon as the gas-space temperature has reached the boiling point of methanol, the methanol is distilled off via a column. The residue solution is filtered, the toluene is removed by distillation at 5 hPa (abs.), and a 60% solution is prepared from the residue using xylene. A solution of an organopolysiloxane comprising 3-mercaptopropylsiloxane units, 3-mercaptopropylmethylsiloxane units and phenylsiloxane units, having a viscosity of 5.3 $mm^2 \cdot s^{-1}$ at 25° C. and an HS equivalent weight of 340 is obtained.

(b) A red basecoat is prepared by dispersing the following components in a bead mill at 6,000 rpm:

150.0 g of a 30% solution of the acrylic-containing organic resin prepared in accordance with Example 3 (a),
2.5 g of Bentone 34 paste (10% in xylene), a thixotropic agent obtainable from Kronos-Titan,
12.0 g of Sicomin Red K 3030 S, a colored pigment obtainable from BASF AG,
0.3 g of silicone oil L 054, a leveling agent obtainable from Wacker-Chemie GmbH,
2.0 g of xylene and
2.0 g of ethyl glycol acetate The red basecoat contains 75 meq of acrylic groups. It is mixed with 25.8 g of the solution of the 3-mercaptopropyl-containing organopolysiloxane prepared in accordance with (a) above, and 6.75 g of the catalyst solution prepared in Example 1 (b), to form the ready-to-use paint, which has a gelling time of about 3 days at 25° C. The paint is cured by baking at 80° C. for 30 minutes. The cured paint has the properties summarized in Table 4.

TABLE 4

| | |
|---|---|
| Pencil hardness(1) | 3H |
| Gasoline test (30 min/25° C.)(5) | no traces of dissolution |
| Gloss (60°)(6) | 94% |

(1)by the method of Wolff-Wilborn
(5)resistance to premium gasoline: a cotton wool swab soaked in premium gasoline is laid on the cured film for 30 minutes at 25° C.
(6)reflection level in % at an incident light angle of 60°.

EXAMPLE 5

(a) About 90 g of a phenylmethylpolysiloxane containing 14% by weight of Si-bonded methoxy groups (obtainable from Wacker-Chemie GmbH under the tradename SY 231) are equilibrated for 3 hours with vigorous boiling with 98 g of 3-mercaptopropyltrimethoxysilane, 3 g of glacial acetic acid and 10 ml of water, and all the volatile constituents are then removed by distillation at 80° C. and at 5 hPa. About 162 g of a clear, colorless liquid having a viscosity of 140 mm²·s⁻¹ are obtained.

(b) About 100 g of the 60% solution in xylene of the acrylic-containing organic resin prepared in Example 3 (a), 32 g of the 3-mercaptopropyl-containing organopolysiloxane prepared in (a) above, and 10 ml of xylene are homogeneously mixed. In accordance with Table 5, various amounts of the catalyst solution prepared in Example 1 (b) and various amounts of glacial acetic acid are added to the mixture, the amounts being given in g/100 g of acrylic-containing organic resin (based on the above 60% solution). Each of the paint solutions are applied to Erichsen steel using a doctor blade. The respective curing conditions and the respective properties of the cured film are shown in Table 5.

TABLE 5

| Mixture | Curing conditions | | | | | | | | | |
|---|---|---|---|---|---|---|---|---|---|---|
| | 0.5 h/60° C. | | | | | 0.5 h/80° C. | | | | |
| | a | b | c | d | e | a | b | c | d | e |
| Catalyst solution⁽⁰⁾ | — | 2 | 2 | 2 | 5 | — | 2 | 2 | 2 | 5 |
| Glacial acetic acid⁽⁰⁾ | — | — | 1 | 2 | 4 | — | — | 1 | 2 | 4 |
| Gelling time at 25° C. (h) | >24 | 2 | 12 | >24 | 12 | >24 | 2 | 12 | >24 | 12 |
| Pencil hardness⁽¹⁾ | 6B | H | H | H | H | 6B | H | H | H | H |
| T-bend test⁽²⁾ | 1 | 3 | 3 | 3 | 3 | 1 | 3 | 4 | 3 | 4 |
| Cross-hatch test⁽³⁾ | Gt0 | Gt0- | Gt0 | Gt0 | Gt0 | Gt0 | Gt0-Gt1 | Gt0- | Gt0 | Gt0 |
| MEK double wipe⁽⁴⁾ | 1 | 14 | 13 | 7 | 15 | 1 | 17 | 19 | 17 | 22 |
| Gasoline test⁽⁵⁾ | — | ++ | ++ | ++ | ++ | — | ++ | ++ | ++ | ++ |

⁽⁰⁾g/100 g of acrylic-containing organic resin (60% solution)
⁽¹⁾by the method of Wolff-Wilborn
⁽²⁾determined by the method of ASTM 4145; the film flexibility is determined on bending the substrate at 180° C. The smaller the value, the more flexible the paint film
⁽³⁾determined by the method of DIN 53 151; the combination of paint adherence and film flexibility is determined on scratching. In the scale Gt0 to Gt4, Gt0 is the best value.
⁽⁴⁾resistance to methyl ethyl ketone at a dry film thickness of 30 micrometers. The greater the value, the greater the resistance
⁽⁵⁾resistance to premium gasoline: a cotton wool swab soaked in premium gasoline is laid on the cured film for 30 minutes at 25° C.
— = the film clearly dissolves
++ = no traces of dissolution of the film.

If a catalyst is not added (mixture a), the paint does not crosslink even at 80° C. Addition of 0.13% by weight (% by weight of solvent-free tetrabutylammonium acetate, based on the total weight of mercaptoalkyl-containing organopolysiloxane and solvent-free, acrylic-containing organic resin) of catalyst, as in mixture (b), results in crosslinked, hard and at the same time flexible films, even at a curing temperature of 60° C. The pot life of the liquid paint mixture can be extended without significantly changing the properties of the cured film by adding glacial acetic acid.

EXAMPLE 6

The paint mixtures of Example 5, (b) and (d) are cured for 30 minutes at 80° C. after evaporation. The Konig pendulum hardness in accordance with DIN 53 157 is then measured after one day and after nine days, the attenuation time of the pendulum from a deflection of 6° to 3° being determined. The greater the value for the pendulum hardness, the less the attenuation, and the harder the paint film.

The results are summarized in Table 6.

TABLE 6

| | Pendulum hardness (sec.) | |
|---|---|---|
| | after 1 day | after 9 days |
| Mixture (b) | 89 | 130 |

TABLE 6-continued

| | Pendulum hardness (sec.) | |
|---|---|---|
| | after 1 day | after 9 days |
| Mixture (d) | 78 | 134 |

What is claimed is:

1. A thermocurable composition containing (A) at least one mercaptoalkyl-containing compound which contains at lest two SiC-bonded radicals per molecule of the general formula $$HS-R^2- \tag{1}$$

where $R^2$ represents a divalent hydrocarbon radical having from 1 to 8 carbon atom(s) per radical, selected from the group consisting of mercaptoalkyl-containing organopolysiloxanes and cocondensates of mercaptoalkyl-containing organosilicon compounds containing groups capable of condensation, and hydroxyl-containing organic compounds selected from the group consisting of polyhydric alcohols and polyester polyols, (B) at least one vinyl-containing compound which is compatible with constituent (A) and contains at least two groups per molecule of the general formula $$R^4CH=CR^3C(O)O- \tag{II}$$

where $R^3$ is selected from the group consisting of a hydrogen atom and a methyl radical, and $R^4$ is selected from the group consisting of a hydrogen atom and an alkyl radical having from 1 to 3 carbon atom(s) per radical, and (C) a mixture containing a strong organic base selected from the group consisting of quaternary ammonium hydroxides, quaternary ammonium alkoxides, tertiary, secondary and primary amines, and a weak protonic acid.

2. The thermocurable composition of claim 1, wherein the mercaptoalkyl-containing organopolysiloxane having average units of the general formula $$R_a(R^1O)_b(HSR^2)_cSiO_{\frac{4-(a+b+c)}{2}} \quad (III)$$

where R is a monovalent hydrocarbon radical having from 1 to 8 carbon atom (s) per radical, $R^1$ is selected from the group consisting of a hydrogen atom and an alkyl radical having from 1 to 6 carbon atom(s) per radical, $R^2$ is a divalent hydrocarbon radical having from 1 to 8 carbon atom(s) per radical, a is 0, 1, 2 or 3, with an average of from 0.0 to 2.0, b is 0, 1 or 2, with an average of from 0.0 to 2.0, c is 0, 1 or 2, with an average of from 0.05 to 1.0, and the sum a+b+c is less than 4, and the average of the sum a+b is a maximum of 2.0, with the proviso that at least two radicals of the formula $HS—R^2—$ are present per molecule.

3. The thermocurable composition of claim 1, wherein the mercaptoalkyl-containing compound (A) is one selected from the group consisting of cocondensates prepared from a mercaptoalkyl-containing silane of the general formula $$R_d(HSR^2)Si(OR^1)_{3-d} \quad (IV)$$

where R is a monovalent hydrocarbon radical having from 1 to 8 carbon atom(s) per radical, $R^1$ is selected from the group consisting of a hydrogen atom and an alkyl radical having from 1 to 6 carbon atom(s) per radical, $R^2$ is a divalent hydrocarbon radical having from 1 to 8 carbon atom(s) per radical, and d is 0, 1 or 2, and a hydroxyl containing organic compound selected from the group consisting of polyhydric alcohols and polyester polyols which can be homogeneously condensed with the mercaptoalkyl-containing silane and cocondensates prepared from a mercaptoalkyl-containing organopolysiloxane having average units of the general formula $$R_a(R^1O)_b(HSR^2)_cSiO_{\frac{4-(a+b+c)}{2}} \quad (III)$$

where R, $R^1$ and $R^2$ are the same as above, a is 0, 1, 2 or 3, with an average of from 0.0 to 2.0, b is 0, 1 or 2, with an average of from 0.0 to 2.0, c is 0, 1 or 2, with an average of from 0.5 to 1.0, and the sum a+b+c is less than 4, and the average of the sum a+b is a maximum of 2.0, and a hydroxyl containing organic compound, selected from the group consisting of polyhydric alcohols and polyester polyols which can be homogeneously condensed with this organopolysiloxane.

4. The thermocurable composition of claim 1, wherein the vinyl-containing compound (B) is selected from the group consisting of (1) products obtained from the reaction of α, β-unsaturated carboxylic acids of the general formula $$R^4CH=CR^3C(O)OH \quad (II')$$

where $R^3$ is selected from the group consisting of a hydrogen atom and a methyl radical and $R^4$ is selected from the group consisting of a hydrogen atom and an alkyl racial having from 1 to 3 carbon atom(s) per radical, with an organic compound selected from the group consisting of (a) polyhydric alcohols, (b) OH-containing polyethers, (c) OH-containing polyesters, (d) OH-containing copolymers of styrene and hydroxyalkyl esters of acrylic acid or methacrylic acid and, optionally an alkyl ester of an α, β-unsaturated monocarboxylic acid or an α, β-unsaturated dicarboxylic acid, and (e) epoxide containing copolymers of styrene and epoxy alkyl esters of acrylic acid or methacrylic acid and optionally an alkyl ester of an α, β-unsaturated monocarboxylic acid or an α, β-unsaturated dicarboxylic acid, (2) products obtained from the reaction of hydroxyalkyl esters of α, β-unsaturated carboxylic acids of the general formula $$R^4CH=CR^3C(O)OH \quad (II')$$

where $R^3$ and $R^4$ are the same as above, with an organic polymer selected from the group consisting of isocyanate containing organic polymers and polyurethanes, (3) products obtained from the reaction of isocyanatoalkyl esters of α, β-unsaturated carboxylic acids having the general formula $$R^4CH=CR^3C(O)OH \quad (II')$$

where $R^3$ and $R^4$ are the same as above with OH-containing organic compounds selected from the group consisting of polyhydric alcohols, polyethers, polyesters and copolymers of styrene and hydroxyalkyl esters of an acid selected from the group consisting of acrylic acid and methacrylic acid, and (4) mixtures containing the product obtained from the reaction of the α, β-unsaturated carboxylic acids of formula (II') with polyhydric alcohols and one of the reaction products of 1(b) to (3).

5. The thermocurable composition of claim 4, wherein the product 1(a) is an ester selected from the group consisting of 1,4-butanediol diacrylate, neopentyl glycol diacrylate, 1,6-hexanediol diacrylate, trimethylolpropane triacrylate, pentaerythritol triacrylate and pentaerythritol tetraacrylate.

6. The thermocurable composition of claim 4, wherein the product 1(e) is obtained from the reaction of an acid selected from the group consisting of an acrylic acid and methacrylic acid with an epoxide-containing copolymer obtained from the copolymerization of glycidyl methacrylate, styrene and dimethyl maleate.

7. The thermocurable composition of claim 1, wherein component (C) is a mixture of a quaternary ammonium hydroxide selected from the group consisting of trimethylbenzylammonium hydroxide, trimethylcetylammonium hydroxide, tetraethylammonium hydroxide and tetrabutylammonium hydroxide, and an organic carboxylic acid selected from the group consisting of formic acid, acetic acid and propionic acid.

8. The thermocurable composition of claim 2, wherein component (C) is a mixture of a quaternary ammonium hydroxide selected from the group consisting of trimethylbenzylammonium hydroxide, trimethylcetylammonium hydroxide, tetraethylammonium hydroxide and tetrabutylammonium hydroxide, and an organic carboxylic acid selected from the group consisting of formic acid, acetic acid and propionic acid.

9. The thermocurable composition of claim 3, wherein component (C) is a mixture of a quaternary ammonium hydroxide selected from the group consisting of trimethylbenzylammonium hydroxide, trimethylcetylammonium hydroxide, tetraethylammonium hydroxide and tetrabutylammonium hydroxide, and an organic carboxylic acid selected from the group consisting of formic acid, acetic acid and propionic acid.

10. The thermocurable composition of claim 4, wherein component (C) is a mixture of a quaternary ammonium hydroxide selected from the group consisting of trimethylbenzylammonium hydroxide, trimethylcetylammonium hydroxide, tetraethylammonium hydroxide and tetrabutylammonium hydroxide, and an organic carboxylic acid selected from the group consisting of formic acid, acetic acid and propionic acid.

11. The thermocurable composition of claim 5, wherein component (C) is a mixture of a quaternary ammonium hydroxide selected from the group consisting of trimethylbenzylammonium hydroxide, trimethylcetylammonium hydroxide, tetraethylammonium hydroxide and tetrabutylammonium hydroxide, and an organic carboxylic acid selected from the group consisting of formic acid, acetic acid and propionic acid.

12. The thermocurable composition of claim 6, wherein component (C) is a mixture of a quaternary ammonium hydroxide selected from the group consisting of trimethylbenzylammonium hydroxide, trimethylcetylammonium hydroxide, tetraethylammonium hydroxide and tetrabutylammonium hydroxide, and an organic carboxylic acid selected from the group consisting of formic acid, acetic acid and propionic acid.

13. The thermocurable composition of claim 4, wherein the OH-containing copolymers of styrene and hydroxyalkyl esters (d) contains an alkyl ester of an $\alpha,\beta$-unsaturated monocarboxylic acid or an $\alpha,\beta$-unsaturated dicarboxylic acid.

14. The thermocurable composition of claim 4, wherein the epoxide containing copolymers of styrene and epoxy alkyl esters (e) contains an alkyl ester of an $\alpha,\beta$-unsaturated monocarboxylic acid or an $\alpha,\beta$-unsaturated dicarboxylic acid.

15. A process for preparing a thermocurable coating, which comprises applying a mixture containing, (A) at least one mercaptoalkyl-containing compound which contains at least two SiC-bonded radicals per molecule of the general formula $$HS-R^2- \quad (I)$$

where $R^2$represents a divalent hydrocarbon radical having from 1 to 8 carbon atom(s) per radical, selected from the group consisting of mercaptoalkyl-containing organopolysiloxanes and cocondensates of mercaptoalkyl-containing organosilicon compounds containing groups capable of condensation, and hydroxyl-containing organic compounds selected from the group consisting of polyhydric alcohols and polyester polyols, (B) at least one vinyl-containing compound which is compatible with constituent (A) and contains at least two groups per molecule of the general formula $$R^4CH{=}CR^3C(O)O- \quad (II)$$

where $R^3$ is selected from the group consisting of a hydrogen atom and a methyl radical, and $R^4$ is selected from the group consisting of a hydrogen atom and an alkyl radical having from 1 to 3 carbon atom(s) per radical, and (C) a mixture of a strong organic base selected from the group consisting of quaternary ammonium hydroxides, quaternary ammonium alkoxides, tertiary, secondary and primary amines, and a weak protonic acid, to a surface to be coated and thereafter curing the coating at an elevated temperature.

* * * * *